Aug. 4, 1931.  A. C. HUTT  1,817,514
MOTOR ROAD VEHICLE
Filed April 9, 1928  5 Sheets-Sheet 1
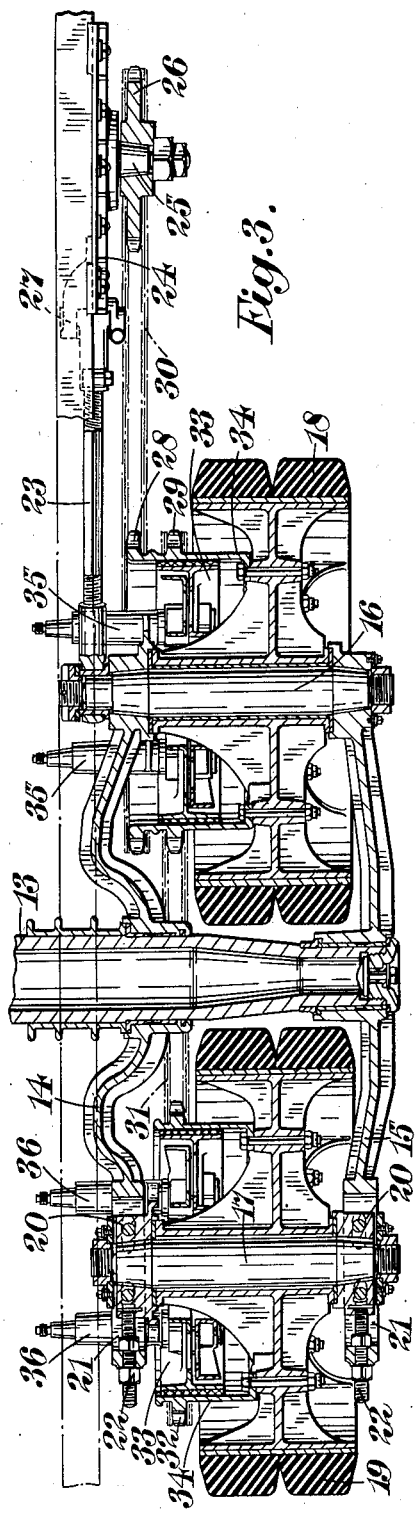
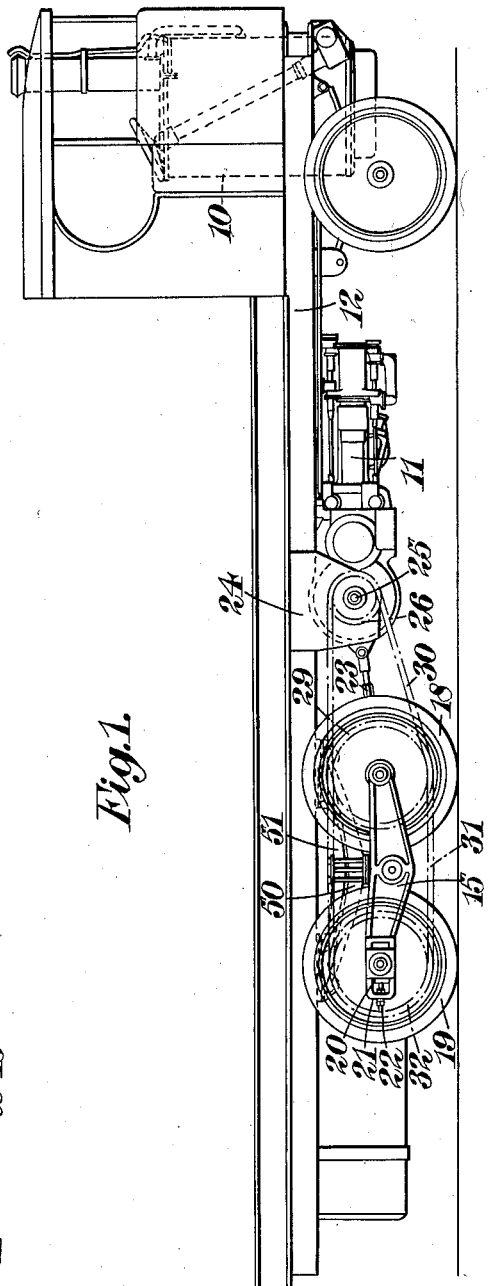
INVENTOR
Arthur C. Hutt
By Watson, Cait, Morse & Grindle
ATTYs

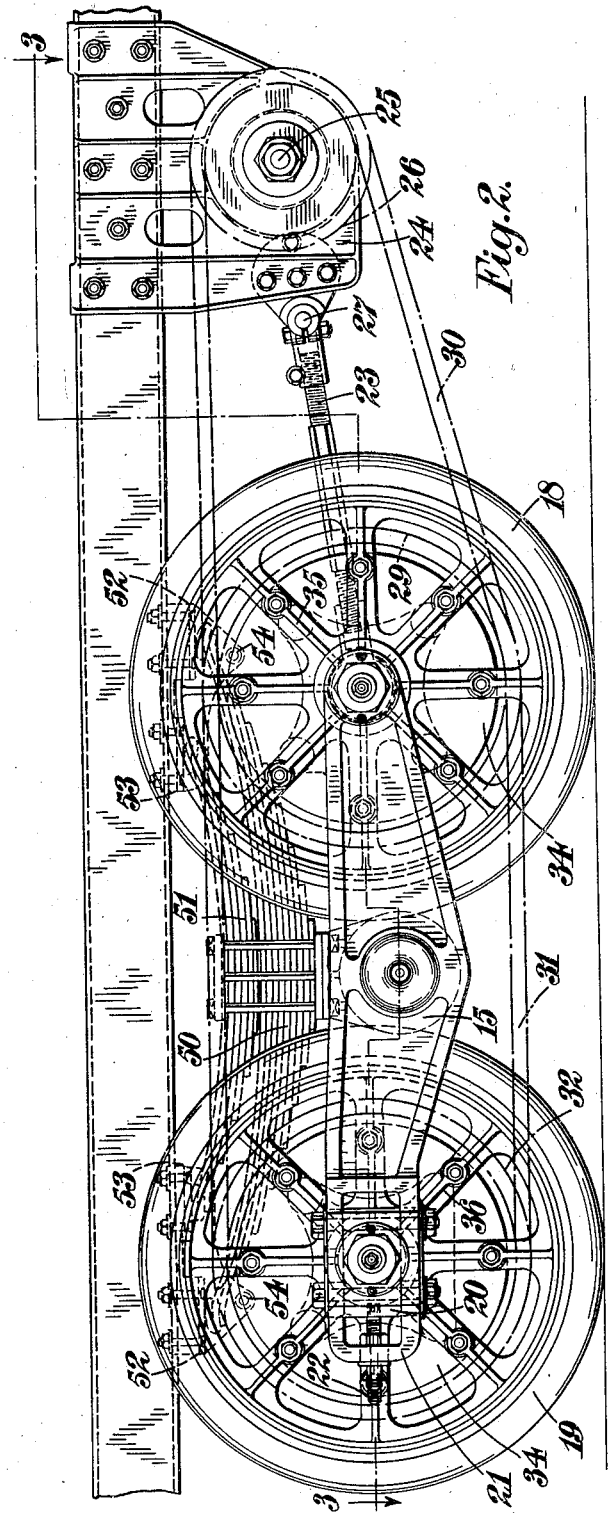

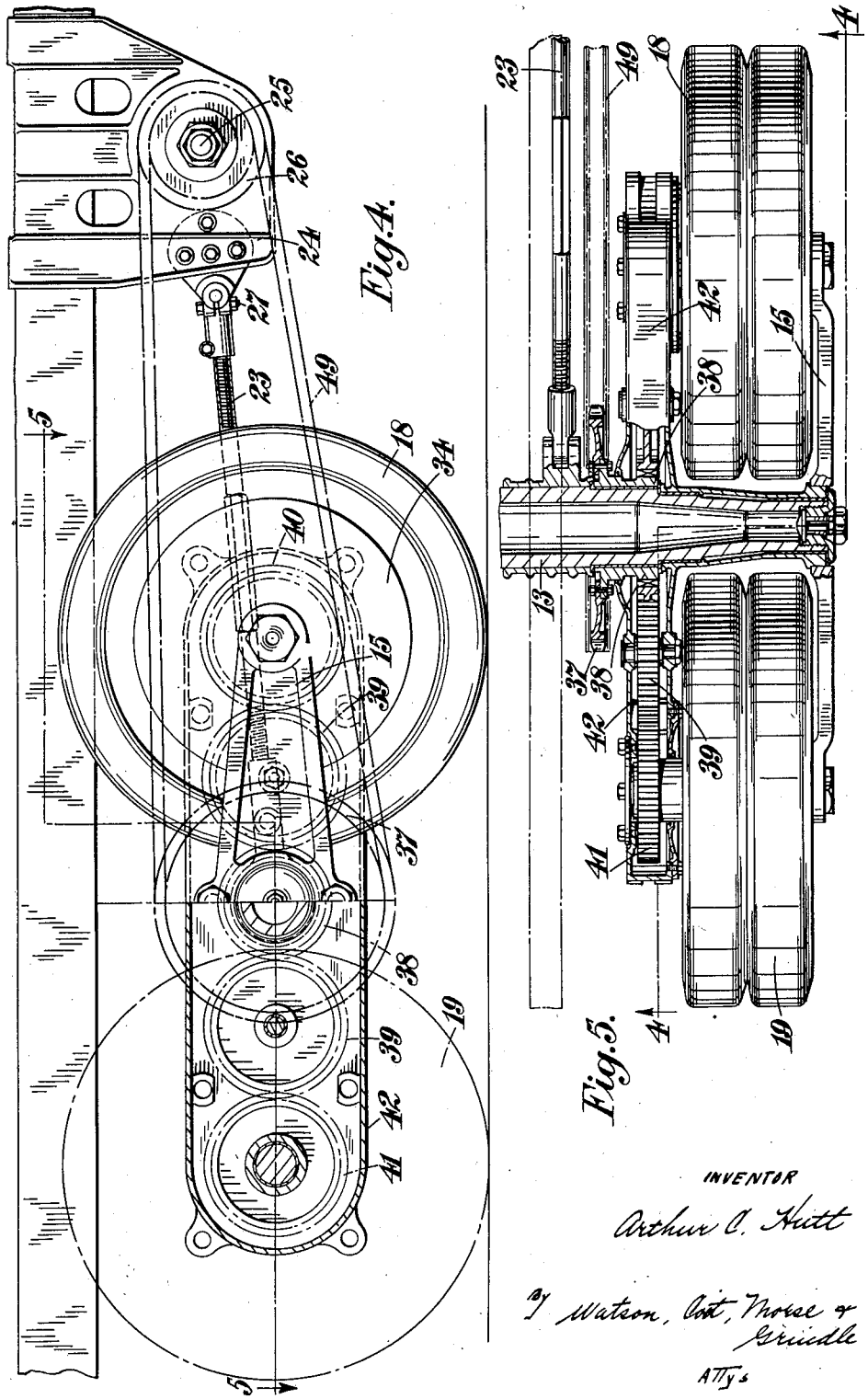

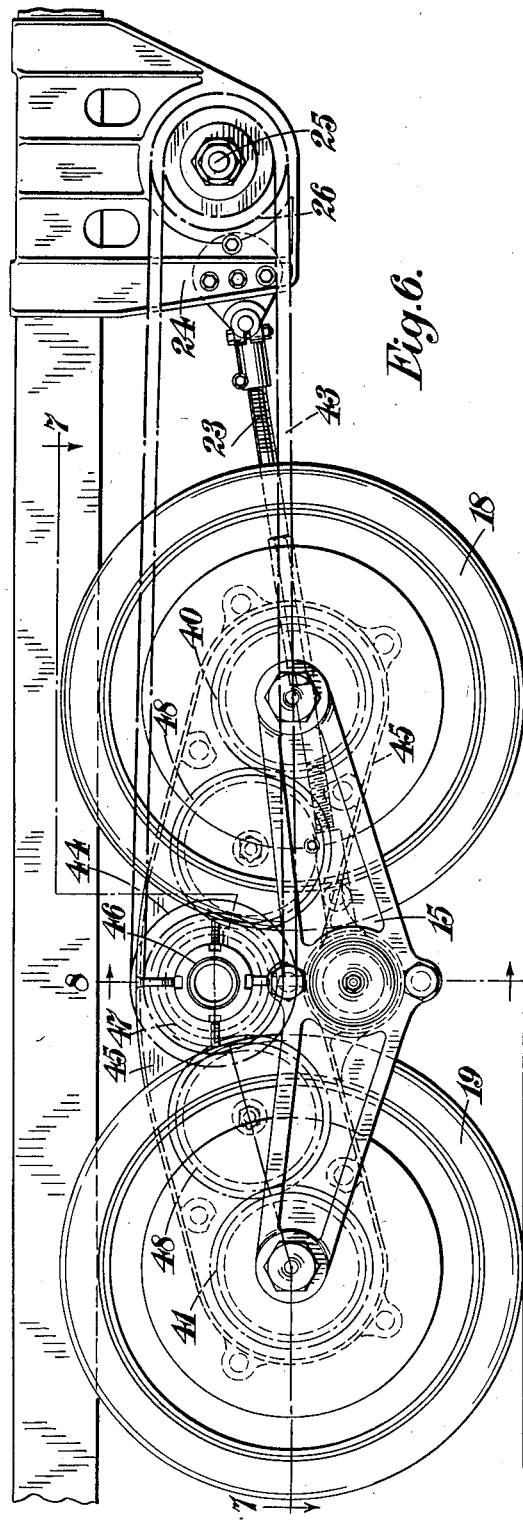

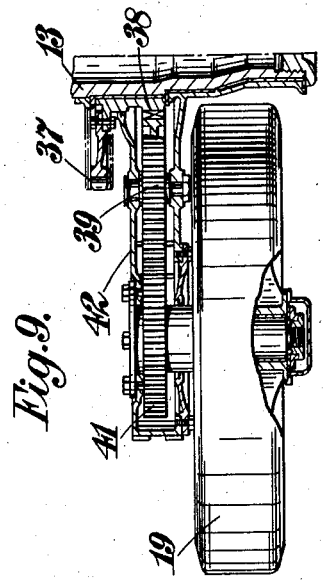

Patented Aug. 4, 1931

1,817,514

UNITED STATES PATENT OFFICE

ARTHUR CYRIL HUTT, OF SHREWSBURY, ENGLAND, ASSIGNOR TO THE "SENTINEL" WAGGON WORKS LIMITED, OF LONDON, ENGLAND, A BRITISH COMPANY

MOTOR ROAD VEHICLE

Application filed April 9, 1928, Serial No. 268,582, and in Great Britain April 14, 1927.

This invention is for improvements in or relating to motor road vehicles of the multi-wheel type i. e. having six or more wheels of which four are driven wheels, these being usually, though not necessarily, located towards the rear of the vehicle.

The present invention has for one of its objects to render more uniform the pressure on the wheels and to reduce road shocks to a minimum.

According to the primary feature of the present invention there is provided a motor road vehicle of the type above described which is characterized in that said four driven wheels receive chain drive from the motor unit and are mounted on horizontal axles which preclude individual swivelling of the road wheels about vertical axes, which horizontal axles are carried two in each of two trunnion frames located one at each side of the vehicle and themselves pivotally mounted about an axis or axes lying transversely of the vehicle so as to be free to move longitudinally of the vehicle relatively to the chassis but being anchored to the chassis by radius rods of adjustable length. Thus, the said road wheels will be able to adjust their vertical setting automatically and secure efficient driving contact with the road surface, while receiving chain drive from the motor unit. The said trunnion frames may conveniently be mounted on a single pivot which extends from one side to the other of the vehicle.

According to another feature of the invention, springs are interposed between the pivot or pivots for the trunnion frames and the vehicle chassis, which springs are carried by the said pivot or pivots and are free to move longitudinally of the vehicle with the pivot or pivots and relatively to the chassis. In order to permit of this longitudinal movement the springs may be arranged to slide in slipper brackets or be attached to swing links.

The trunnion frames may each carry a sprocket wheel receiving a drive chain from the motor unit, and transmitting it to the road wheels.

These and other features of the invention will now be described by way of example only with reference to the accompanying drawings.

In these drawings:—

Figure 1 is a side elevation of a steam driven road vehicle embodying the present invention;

Figure 2 is a side elevation, on a scale larger than that of Figure 1, showing two of the rear wheels and their mounting and driving connections;

Figure 3 is a section on the line 3—3 of Figure 2;

Figure 4 is an elevation, partly in section on the line 4—4 of Figure 5, showing a modified arrangement of driving gear;

Figure 5 is a section on the line 5—5 of Figure 4;

Figure 6 is a side elevation, corresponding to Figure 2, but showing another modified construction;

Figure 7 is a section on the line 7—7 of Figure 6;

Figure 8 is a section on the line 8—8 of Figure 6, and

Figure 9 is a sectional view corresponding to a portion of Figure 5, but showing a further modification.

Like reference numerals indicate like parts throughout the drawings.

Referring to Figure 1, the steam boiler is indicated at 10 and a horizontal steam engine at 11, the latter being located under the chassis 12. The two pairs of rear road wheels are carried upon trunnion frames, the nature of which is more clearly illustrated in Figures 2 and 3. There is a single through pivot 13 of tubular formation having two conical ends on which the trunnion frames are mounted and thus maintained in proper location. The trunnion frames shown in Figures 1 to 3 each consist of two principal members 14 and 15 located respectively on the inside and outside of the road wheels. These principals 14 and 15 are pivoted on the pivot 13 and receive towards their ends short axles 16 and 17 for the road wheels 18 and 19. The axle 17 is carried by blocks 20 which are slidable in guideways 21 in the trunnion frame principals so that the distance between the axles 16 and 17 may be readily adjusted. The adjustment is effected by screws 22. The principal 15 is secured in place by readily detachable fixing means at the end of the pivot 13 and the ends of the axles 16 and 17 and ready access to the road wheels is thus possible. The forward end of each trunnion frame is anchored by a radius rod 23 of adjustable length to a casing 24 depending from the chassis 12, this casing 24 being part of, or attached to, the casing of the engine 11. In this casing there is mounted a shaft 25, which may be the crankshaft of the engine, or a shaft driven thereby, and which carries a sprocket wheel 26. One end of the radius rod 23 is pivoted by a pin 27 to the casing 24 and the other end of the radius rod is anchored around the projecting end of the axle 16. The setting of the parts is such that in the normal running position of the vehicle the axis of the shaft 25, the axis of the pin 27, the axis of the front axle 16 and the axis of the pivot 13 are in alignment, i. e. lie in a single plane. This will ensure that the pull of the driving chains and the consequent thrust of the radius rods will not cause unequal loading on the road wheels. The forward road wheel 18 carries two sprocket wheels 28 and 29 which are integral with each other. The former is driven by a chain 30 from the sprocket wheel 26 (slack being taken up by adjusting the length of the rod 23), and the sprocket wheel 29 drives, through a chain 31, a sprocket wheel 32 on the rear road wheel 19. Means are provided for braking all four rear road wheels, the brake shoes being indicated at 33 and the drums at 34. The brake spindles for the forward road wheels are carried through bosses 35 on the trunnion frame principal 14, and the brake spindles for the rear road wheels are carried through bosses 36 on the aforesaid adjustable blocks 20. In this way adjustment of the rear axle to take up slack in the chain 31 will not interfere with the relative positions of the brake spindles and shoes.

The springs between the chassis and the road wheels are indicated at 50 and 51, they being carried by the pivot 13. The ends of the springs reach out to bear against slipper brackets 52 and 53, but are not anchored to these brackets so that relative movement fore and aft of the vehicle is possible. The brackets 52 carry cross pins 54 to take rebound shocks and the springs 50 are intended to take the main part of the load, the springs 51 being only intended to come into operation when the load rises above a predetermined amount. Consequently, although they may appear to be bearing against the slipper brackets 53, the pressure they are exerting is negligible unless the springs 50 have been considerably flattened by the load. Alternatively, the converse arrangement may be adopted, and the upper springs be reinforced by the lower when the load is heavy.

Referring now to the construction shown in Figures 4 and 5, this is on the same general lines as that of Figures 1 to 3, but the two axles 16 and 17 are not connected together by a chain. The pivot 13 carries a sprocket wheel 37 which is driven by a chain 49 from the sprocket wheel 26. Integral with the sprocket wheel 37 is a gear wheel 38 which is connected by idlers 39 to other gear wheels 40 and 41 secured respectively to the axles 16 and 17 of the road wheels. The inside trunnion frame principal takes the form of a hollow casing 42 which encloses the wheels 38, 39 and 40 and they may run in oil if desired. The radius rods 23 are anchored to the pivot 13, the setting being such, in relation to the sprocket wheels 26 and 37, that no slackening or stretching of the chain occurs with normal rise and fall of the road wheels and trunnion frames, and that unequal loading on the road wheels is not caused.

In the construction shown in Figures 6, 7 and 8, the sprocket wheel 26 drives, through a chain 43, a sprocket wheel 44 which is located above the main pivot 13, being carried by a hollow trunnion frame principal 45 which is somewhat similar to the aforesaid hollow principal 42. Inside the hollow principal 45, on a shaft 46 which carries the sprocket wheel 44 there is a gear wheel 47 which, through idlers 48 drives the gear wheels 40 and 41 on the road wheel axles.

The construction shown in Figure 9 is similar to that shown in Figures 4 and 5, except that there is no outer principal to the trunnion frames. This construction is suitable for lighter loads than can be accommodated by the constructions shown in Figures 4 and 5. It will be appreciated that in the construction shown in Figures 4 to 9, the pivot 13 supports the vehicle by means of springs 50 and 51 as shown in Figures 1 and 2, these springs being omitted in Figures 4 to 9 for the sake of clearness.

It is to be understood that the invention is not restricted to the precise constructional details set forth.

I claim:—

1. A motor road vehicle having at least six road wheels whereof four are driven wheels, and having in combination two trunnion frames, one at each side of the vehicle, horizontal axles for the four driven wheels which preclude individual swivelling of the said wheels about vertical axes, means for carrying said axles two in each trunnion frame, means for pivotally mounting each trunnion frame about an axis lying transversely of the vehicle so as to be free to move longitudinally of the vehicle relatively to the chassis, radius rods of adjustable length for anchoring the trunnion frames and their pivotal mounting to the chassis, and chain driving means coupling the motor unit to the said driven road wheels.

2. A motor road vehicle having at least six road wheels whereof four are driven wheels, and having in combination two trunnion frames, one at each side of the vehicle, horizontal axles for the four driven wheels which preclude individual swivelling of the said wheels about vertical axes, means for carrying said axles two in each trunnion frame, a single pivot extending from one side of the vehicle to the other and carrying both of the trunnion frames in such a manner as to be free to move longitudinally of the vehicle relatively to the chassis, radius rods of adjustable length for anchoring the trunnion frames and their pivotal mounting to the chassis, and chain driving means coupling the motor unit to the said driven road wheels.

3. A motor road vehicle having at least six road wheels whereof four are driven wheels, and having in combination two trunnion frames, one at each side of the vehicle, horizontal axles for the four driven wheels which preclude individual swivelling of the said wheels about vertical axes, means for carrying said axles two in each trunnion frame, means for pivotally mounting each trunnion frame about an axis lying transversely of the vehicle so as to be free to move longitudinally of the vehicle relatively to the chassis, radius rods of adjustable length for anchoring the trunnion frames and their pivotal mounting to the chassis, springs interposed between said pivotal mounting and the chassis, which springs are carried by the pivotal mounting and are free to move longitudinally of the vehicle with the pivotal mounting and relatively to the chassis, and chain driving means coupling the motor unit to the said driven road wheels.

4. A motor road vehicle having at least six road wheels whereof four are driven wheels, and having in combination two trunnion frames, one at each side of the vehicle, horizontal axles for the four driven wheels which preclude individual swivelling of the said wheels about vertical axes, means for carrying said axles two in each trunnion frame, means for pivotally mounting each trunnion frame about an axis lying transversely of the vehicle so as to be free to move longitudinally of the vehicle relatively to the chassis, radius rods of adjustable length for anchoring the trunnion frames and their pivotal mounting to the chassis, a sprocket wheel associated with each trunnion frame, drive-transmitting means coupling the sprocket wheels and the road wheels, and chains coupling said sprocket wheels to the motor unit.

5. A motor road vehicle having at least six road wheels whereof four are driven wheels, and having in combination two trunnion frames, one at each side of the vehicle, horizontal axles for the four driven wheels which preclude individual swivelling of the said wheels about vertical axes, means for carrying said axles two in each trunnion frame, means for pivotally mounting each trunnion frame about an axis lying transversely of the vehicle so as to be free to move longitudinally of the vehicle relatively to the chassis, radius rods of adjustable length for anchoring the trunnion frames and their pivotal mounting to the chassis, a sprocket wheel fast on a road wheel at each side of the vehicle, and chain gearing coupling said sprocket wheel to the other road wheel in the appropriated trunnion frame, and to the motor unit.

6. A motor road vehicle of the multi-wheel type, having in combination two distinct trunnion frames, one at each side of the vehicle, means for mounting two of the road wheels in each trunnion frame, means for pivotally mounting each trunnion frame to rock about an axis lying transversely of the vehicle independently one of the other, two sprocket wheels, each of which is associated with one of the trunnion frames, chains for imparting drive to said sprocket wheels from the motor unit, a separate train of gearing interposed at each side of the vehicle between each said sprocket wheel and the road wheels at the same side of the vehicle, and radius rods of adjustable length for anchoring the trunnion frames and their pivotal mounting to the vehicle chassis.

7. A motor road vehicle of the multi-wheel type, having in combination two trunnion frames, one at each side of the vehicle, means for mounting two of the road wheels in each trunnion frame, means for pivotally mounting each trunnion frame about an axis lying transversely of the vehicle, a sprocket wheel associated with each trunnion frame, a driving shaft associated with the motor unit, chains for transmitting drive to said sprocket wheels from the driving shaft, a separate train of gearing interposed at each side of the vehicle between each said sprocket wheel and the road wheels, and radius rods of adjustable length for anchoring the trunnion frames and their pivotal mounting to the vehicle chassis and serving to adjust the trunnion frames independently one of the other, which rods are arranged radially with respect to the axis of the said driving shaft and also so arranged that in the normal running position of the vehicle parts the axis of the pivotal mounting of the trunnion frames is approximately intersected by a prolongation of the longitudinal axis of each radius rod.

8. A motor road vehicle of the multi-wheel type, having in combination two trunnion frames, one at each side of the vehicle, means for mounting two of the road wheels in each trunnion frame, means for pivotally mounting each trunnion frame to rock independently of the other about an axis lying transversely of the vehicle, a gear wheel carried on and movable with each trunnion frame, means for imparting drive to said gear wheels from the motor unit, separate gearing interposed at each side of the vehicle between each said gear wheel and an associated road wheel, and means for adjusting the distance between the road wheels and the associated driving gear wheels.

9. A motor road vehicle of the multi-wheel type, having in combination two trunnion frames, one at each side of the vehicle, four bearings for mounting two of the road wheels in each trunnion frame, two of which bearings are adjustable along the trunnion frames, means for pivotally mounting each trunnion frame about an axis lying transversely of the vehicle, a gear wheel carried on each trunnion frame, means for imparting drive to said gear wheels from the motor unit, a separate train of chain gearing interposed at each side of the vehicle between each said gear wheel and the road wheels, and brake gear carried on the said adjustable bearings and operating on the associated adjustable road wheels.

In testimony whereof I affix my signature.

ARTHUR CYRIL HUTT.